United States Patent
Zimmermann et al.

(10) Patent No.: US 7,891,637 B2
(45) Date of Patent: Feb. 22, 2011

(54) MAGNETIC FLUID COUPLING ASSEMBLIES AND METHODS

(75) Inventors: Joerg Zimmermann, Vancouver (CA); Jeremy Schrooten, Mission (CA)

(73) Assignee: Angstrom Power Incorporated, North Vancouver (CA)

(*) Notice: Subject to any disclaimer, the term of this patent is extended or adjusted under 35 U.S.C. 154(b) by 626 days.

(21) Appl. No.: 11/936,662

(22) Filed: Nov. 7, 2007

(65) Prior Publication Data

US 2008/0143098 A1 Jun. 19, 2008

Related U.S. Application Data

(60) Provisional application No. 60/864,749, filed on Nov. 7, 2006, provisional application No. 60/882,045, filed on Dec. 27, 2006.

(51) Int. Cl.
*F16L 37/28* (2006.01)

(52) U.S. Cl. .............. 251/149.9; 251/149.6; 251/149.7; 251/65

(58) Field of Classification Search ........... 251/142, 251/149, 149.1, 149.3, 149.6, 149.7, 149.9
See application file for complete search history.

(56) References Cited

U.S. PATENT DOCUMENTS

| | | | |
|---|---|---|---|
| 3,104,088 A * | 9/1963 | Cator | 251/149.6 |
| 3,181,895 A | 5/1965 | Cator | |
| 3,586,048 A | 6/1971 | Arnold | |
| 4,027,708 A | 6/1977 | Hansel | |
| 4,049,295 A | 9/1977 | Piers | |
| 4,207,485 A | 6/1980 | Silver | |
| RE30,428 E | 11/1980 | Detty | |
| 4,262,712 A | 4/1981 | Young | |
| 4,346,797 A | 8/1982 | Bopp | |

(Continued)

FOREIGN PATENT DOCUMENTS

CA 2585649 12/2007

(Continued)

OTHER PUBLICATIONS

"PCT Application No. PCT/CA2007/001995 International Search Report mailed Mar. 17, 2008", 5 pgs.

(Continued)

*Primary Examiner*—John K Fristoe, Jr.
(74) *Attorney, Agent, or Firm*—Schwegman, Lundberg & Woessner, P.A.

(57) ABSTRACT

Fluid coupling assemblies and methods are discussed. The fluid coupling assemblies include a first coupling member, a second coupling member magnetically engageable with the first coupling member, and a seal member disposed between a portion of the first coupling member and a portion of the second coupling member. A magnetic engagement of the first coupling member and the second coupling member unseals a fluid flow path therebetween. In certain examples, the first coupling member is sealed by a valve member and the second coupling member includes an activation member. When engaged, the valve member is moved from a closed position to an open position by the activation member, thereby unsealing the fluid flow path. A magnetic force between the first coupling member and the second coupling member can be chosen such that the members disengage when a predetermined fluid flow path pressure is reached.

40 Claims, 6 Drawing Sheets

U.S. PATENT DOCUMENTS

| | | | |
|---|---|---|---|
| 4,390,038 A | 6/1983 | Salvato | |
| 5,215,122 A | 6/1993 | Rogers et al. | |
| 5,293,902 A | 3/1994 | Lapierie | |
| 5,366,262 A | 11/1994 | Couvreur | |
| 5,375,811 A | 12/1994 | Reinicke | |
| 5,419,354 A * | 5/1995 | Krynicki | 137/1 |
| 5,464,041 A | 11/1995 | Reinicke | |
| 5,544,858 A | 8/1996 | Rogers | |
| 5,588,502 A | 12/1996 | Bedi et al. | |
| 5,711,553 A | 1/1998 | Bonser | |
| 5,964,483 A | 10/1999 | Long et al. | |
| 6,109,284 A | 8/2000 | Johnson et al. | |
| 6,158,717 A | 12/2000 | Van Scyoc et al. | |
| 6,637,779 B2 | 10/2003 | Andre | |
| 6,665,508 B2 | 12/2003 | Sudo et al. | |
| 6,722,628 B1 | 4/2004 | Seil | |
| 6,739,578 B2 | 5/2004 | Barton et al. | |
| 7,014,220 B2 | 3/2006 | Szabo et al. | |
| 7,089,645 B2 | 8/2006 | Malone | |
| 7,115,335 B2 | 10/2006 | Eggum | |
| 7,168,597 B1 * | 1/2007 | Jones et al. | 222/402.2 |
| 7,252,112 B1 * | 8/2007 | Imler et al. | 137/614.04 |
| 7,487,796 B2 * | 2/2009 | Imler et al. | 137/614.04 |
| 7,563,305 B2 | 7/2009 | Zimmermann | |
| 7,708,815 B2 | 5/2010 | Zimmermann | |
| 2006/0127733 A1 | 6/2006 | Kaschmitter et al. | |
| 2007/0024238 A1 | 2/2007 | Nakade et al. | |
| 2007/0068599 A1 | 3/2007 | Iaconis | |
| 2007/0084879 A1 | 4/2007 | McLean et al. | |
| 2007/0287302 A1 | 12/2007 | Lindberg et al. | |
| 2008/0038617 A1 | 2/2008 | McLean et al. | |

FOREIGN PATENT DOCUMENTS

| | | |
|---|---|---|
| GB | 2381050 | 4/2003 |
| JP | 2007192287 | 8/2002 |
| WO | WO 2005004258 A2 | 1/2005 |

OTHER PUBLICATIONS

"PCT Application No. PCT/CA2007/001995, Written Opinion mailed Apr. 3, 2008", 8 pgs.

"Chinese Application Serial No. 200780048398.4, Office Action Mailed Apr. 26, 2010", 8.

"Singapore Application Serial No. 200903112-1, Office Action mailed Apr. 23, 2010", 20 Pgs.

"Singapore Application Serial No. 200903112-1, Office Action Response Filed Sep. 21, 2010", 20 pgs.

* cited by examiner

MAGNETIC FLUID COUPLING ASSEMBLIES AND METHODS

CLAIM OF PRIORITY

This non-provisional application claims the benefit of priority under 35 U.S.C. §119 (e) to U.S. Provisional Patent Application Ser. No. 60/864,749, filed on Nov. 7, 2006, and U.S. Provisional Patent Application Ser. No. 60/882,045, filed on Dec. 27, 2006, both of which are herein incorporated by reference.

TECHNICAL FIELD

This patent document pertains generally to a fluid coupling assembly for fluid transfer applications. More particularly, but not by way of limitation, this patent document pertains to magnetic fluid coupling assemblies and methods.

BACKGROUND

Fluid couplings for fluid transfer applications typically include a socket having a fluid flow passage, and a plug also having a fluid flow passage. The socket is attached to, for example, a first fluid line and the plug is attached to, for example, a second fluid line. The plug is pushed into the socket to join the two lines and one or more valves are thereafter, at a later time, opened to establish a fluid flow path between the two lines. The coupling can be freestanding, or the plug or the socket can be mounted in a manifold, a wall or otherwise secured to a device.

Fluid pressure accompanies the fluid as it is transferred between the first fluid line and the second fluid line. The fluid pressure tends to force the plug and socket apart from one another. For this reason, a lockable mechanical connection is typically made between the socket and the plug. As one example, a bayonet mount can be used to connect the socket and the plug. As another example, a threaded sleeve connected to the socket receives mating threads on the plug. Such a configuration provides a secure fluid connection, but can require considerable connection time and tools (e.g., a wrench or the like) for providing sufficient torque to screw and unscrew the sleeve. Additionally, such mechanical couplings tend to be bulky and consume significant volume or are susceptible to failure.

SUMMARY

The present inventors have recognized, among other things, a quick connect/disconnect fluid coupling assembly which eliminates the need for assembly tools to complete a fluid flow connection between a first coupling member and a second coupling member is needed. In addition, the present inventors have recognized that such assembly should be compact in size, leak tight in structure, robust, and easy to use.

To this end, fluid coupling assemblies and methods comprising first and second magnetically engageable coupling members are discussed herein. A fluid coupling assembly includes a first coupling member, a second coupling member, and a seal member therebetween. The first coupling member and the second coupling member are magnetically engagable, such as by way of a first magnetic member and a second magnetic member having attracted polarities. The engagement of the first coupling member and the second coupling member opens a fluid flow path therebetween. When the coupling members are disengaged, this fluid flow path is sealed.

In Example 1, a fluid coupling assembly comprises a first coupling member having a first engagement portion, the first engagement portion including a valve member; and a second coupling member magnetically engageable with the first coupling member, the second coupling member having a second engagement portion including an activation member; wherein aligned magnetic engagement of the first coupling member and the second coupling member moves the valve member from a resiliently biased sealed position to an unsealed position via the activation member, thereby unsealing a fluid flow path traversing a portion of each coupling member.

In Example 2, the fluid coupling assembly of Example 1 is optionally configured such that an overlap between the first engagement portion and the second engagement portion is about 1 mm or less when magnetically engaged.

In Example 3, the fluid coupling assembly of at least one of Examples 1-2 are optionally configured such that the first coupling member includes a first magnetic member having a first polarity and the second coupling member includes a second magnetic member having a second polarity, the first polarity attracted to the second polarity.

In Example 4, the fluid coupling assembly of Example 3 is optionally configured such that the first magnetic member includes a magnet having a toroidal shape.

Figure 6:
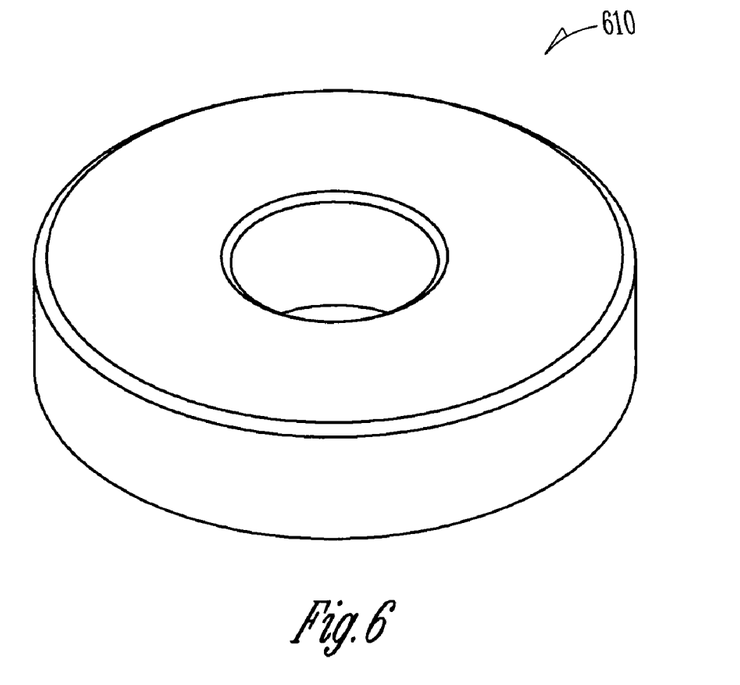
FIG. 6 illustrates a magnet having a torroidal shape.

FIG. 6 illustrates a magnet having a toroidal shape.

In Example 5, the fluid coupling assembly of at least one of Examples 1-4 optionally comprises a seal member disposed between a portion of the first coupling member and a portion of the second coupling member, the seal member configured to prevent fluid leakage when the coupling members are magnetically engaged.

In Example 6, the fluid coupling assembly of Example 5 is optionally configured such that the seal member is disposed around the first engagement portion and includes a ring-shaped elastic member.

In Example 7, the fluid coupling assembly of Example 5 is optionally configured such that the seal member is disposed around the activation member and includes a ring-shaped elastic member.

In Example 8, the fluid coupling assembly of at least one of Examples 1-7 is optionally configured such that the magnetic engagement includes a magnetic force between the first coupling member and the second coupling member, the magnetic force configured such that the first coupling member and the second coupling member disengage when the magnetic force is overcome.

In Example 9, the fluid coupling assembly of Example 8 is optionally configured such that the disengagement of the first coupling member and the second coupling member moves the valve member to the resiliently biased sealed position, thereby sealing the fluid flow path.

In Example 10, the fluid coupling assembly of at least one of Examples 1-9 is optionally configured such that the second coupling member is integrated into a housing of a cellular phone, a satellite phone, a laptop computer, a computer accessory, a display, an audio or video player, a medical device, a television, a transmitter, a receiver, a lighting device, a power tool, or an electronic toy.

In Example 11, a fluid coupling assembly disposed between a fuel supply source and a fuel reservoir in a fuel cell powered device, comprises a first coupling member in fluid communication with the fuel supply source, the first coupling member having a first engagement portion; and a second coupling member integrated in the fuel cell powered device and magnetically engageable with the first coupling member, the second coupling member having a second engagement portion; wherein a magnetic engagement between the first engagement portion and the second engagement portion unseals a fluid flow path traversing a portion of each coupling member, wherein disengagement of the first coupling member and the second coupling member seals the fluid flow path.

In Example 12, the fluid coupling assembly of Example 11 is optionally configured such that the magnetic engagement includes a magnetic force configured such that the first coupling member and the second coupling member disengage when a predetermined internal pressure of the fuel reservoir is reached.

In Example 13, the fluid coupling assembly of at least one of Examples 11-12 is optionally configured such that the magnetic engagement between the first engagement portion and the second engagement portion is substantially depthless.

In Example 14, the fluid coupling assembly of Example 13 is optionally configured such that the predetermined internal pressure is between about 300 psig and 725 psig.

In Example 15, the fluid coupling assembly of at least one of Examples 11-14 is optionally configured such that the first engagement portion includes a valve member and a valve seat, the valve member movable between a sealed position in contact with the valve seat and an unsealed position spaced from the valve seat.

In Example 16, the fluid coupling assembly of at least one of Examples 11-15 is optionally configured such that the fuel cell powered device includes one of a cellular phone, a satellite phone, a laptop computer, a computer accessory, a display, an audio or video player, a medical device, a television, a transmitter, a receiver, a lighting device, a power tool, or an electronic toy.

In Example 17, a method of coupling a fuel supply source and a fuel reservoir in a fuel cell powered device, comprises magnetically engaging a first coupling member in fluid communication with the fuel supply source and a second coupling member in fluid communication with the fuel reservoir, including aligning a first engagement portion of the first coupling member and a second engagement portion of the second coupling member; establishing a seal between the first coupling member and the second coupling member, including preventing fluid leakage between the fuel supply source and the fuel reservoir; and opening a fluid flow path between the first coupling member and the second coupling member, including moving a valve member of the first engagement portion from a resiliently biased sealed position to an unsealed position.

In Example 18, the method of Example 17 is optionally configured such that opening the fluid flow path includes bringing a portion of an activation member of the second engagement portion in contact with a portion of the valve member.

In Example 19, the method of at least one of Examples 17-18 is optionally configured such that opening the fluid flow path includes allowing a stream of at least one of hydrogen, one or more alcohols, butane, formic acid, one or more borohydride compounds, one or more mixtures of alcohols and borohydrides, one or more ammonia borane solutions, one or more carbazole compounds, one or more hydocarbons, one or more alcohols, methane, hydrazine hydrate, propane, or ammonia to flow from the fluid supply source to the fluid receiving reservoir.

In Example 20, the method of at least one of Examples 17-19 is optionally configured such that magnetically engaging the first coupling member and the second coupling member includes coupling a magnet disposed on the first coupling member and a magnetic surface of the second coupling member.

In Example 21, the method of at least one of Examples 17-20 is optionally configured such that magnetically engaging the first coupling member and the second coupling member includes overlapping the first and second engagement portions less than about 1 mm.

In Example 22, the method of at least one of Examples 17-21 is optionally configured such that establishing a seal between the first coupling member and the second coupling member includes compressing a seal member disposed between a portion of the first coupling member and a portion of the second coupling member.

In Example 23, the method of at least one of Examples 17-22 optionally comprises disengaging the first coupling member and the second coupling member, including moving the valve member of the first engagement portion to the resiliently biased sealed position, thereby sealing the fluid flow path.

In Example 24, the method of Example 23 is optionally configured such that disengaging the first coupling member and the second coupling member includes attaining a predetermined internal pressure of the fuel reservoir.

In Example 25, the method of Example 23 is optionally configured such that disengaging the first coupling member and the second coupling member is directionally independent and can include receiving, at one or both of the first or second coupling members, an external side force.

Advantageously, the present fluid coupling assemblies and methods provide a fluid connection that is compact in size, leak tight in structure, robust, and easy to use. Additionally, the present fluid coupling assemblies and methods can be designed such that the magnetic engagement between the fluid supply source and the fluid receiving reservoir automatically disengages when a predetermined pressure is reached within the reservoir or along the fluid flow path, or when an inadvertent force of a predetermined magnitude is externally applied to the engagement. These and other examples, advantages, and features of the present fluid coupling assemblies and methods will be set forth in part in the Detailed Description, which follows, and in part will become apparent to those skilled in the art by reference to the following description of the present fluid coupling assemblies and methods and drawings or by practice of the same.

BRIEF DESCRIPTION OF THE DRAWINGS

In the drawings, like numerals describe similar components throughout the several views. Like numerals having different letter suffixes represent different instances of similar components. The drawings illustrate generally, by way of example, but not by way of limitation, various embodiments discussed in the present document.

DETAILED DESCRIPTION

Figure 1:
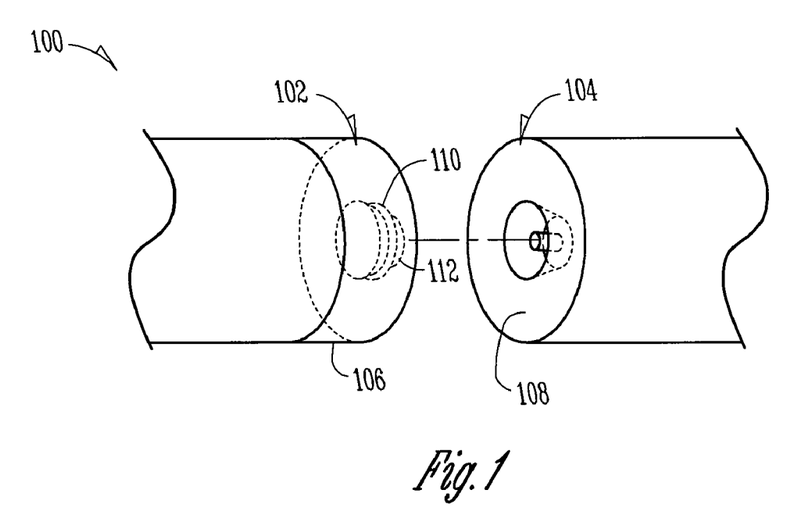
FIG. 1 illustrates a schematic view of a disengaged fluid coupling assembly including a first coupling member and a second coupling member, as constructed in accordance with at least one embodiment.

FIG. 1 illustrates a fluid coupling assembly 100 including a first coupling member 102, a second coupling member 104, and a seal member 110 disposed between the members. The first coupling member 102 and the second coupling member 104 are held in engagement with one another via a magnetic force provided by a first magnetic member 106 disposed on the first coupling member 102 and a second magnetic member 108 on the second coupling member 104. The first magnetic member 106 has a first polarity, which is attracted to a second polarity of the second magnetic member 108. The polarities of the first 106 and second 108 magnetic members can be permanent or induced. For example, the second polarity of the second magnetic member 108 can be generated by a permanent magnet or an induced magnetic effect.

Figure 3:
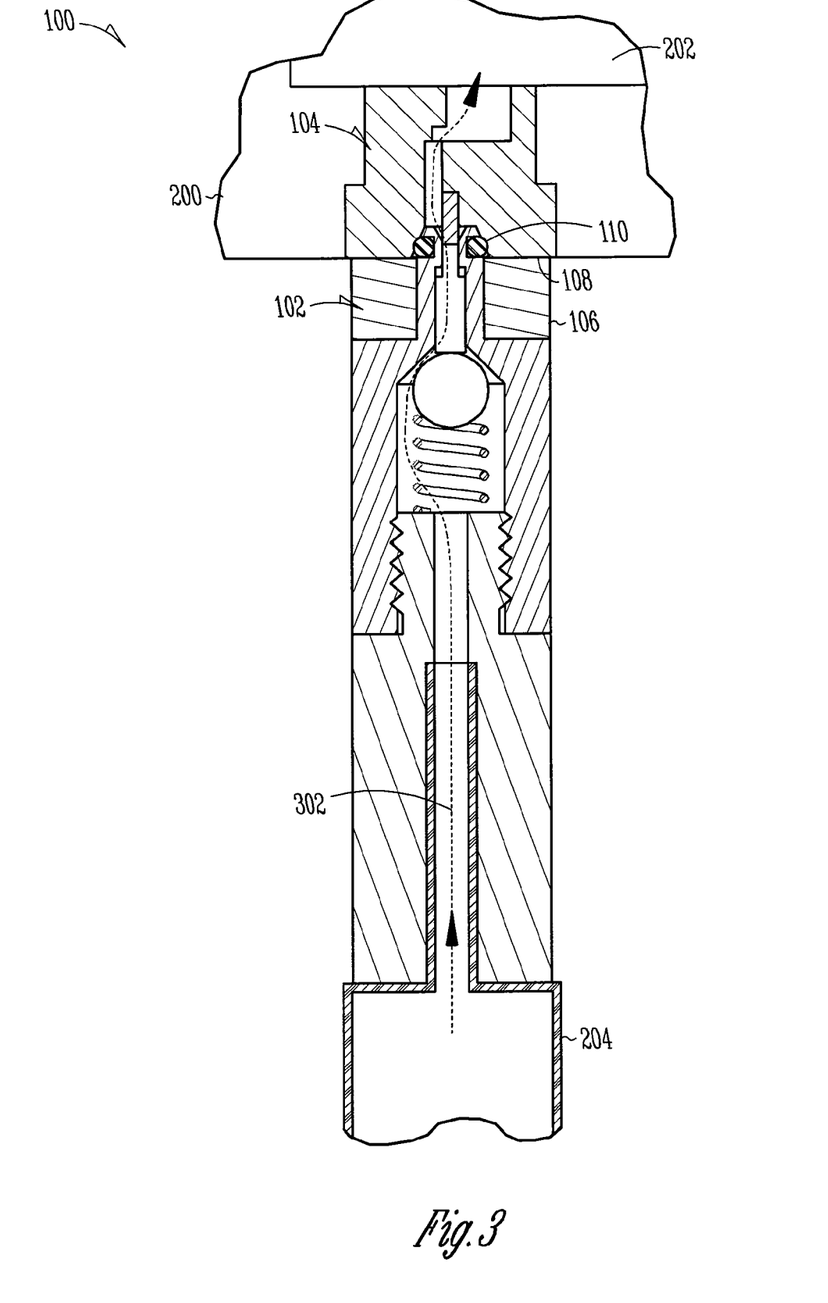
FIG. 3 illustrates, among other things, a sectional view of an engaged fluid coupling assembly in which the cross section is taken through the center of such assembly portions, as constructed in accordance with at least one embodiment.
Figure 4:
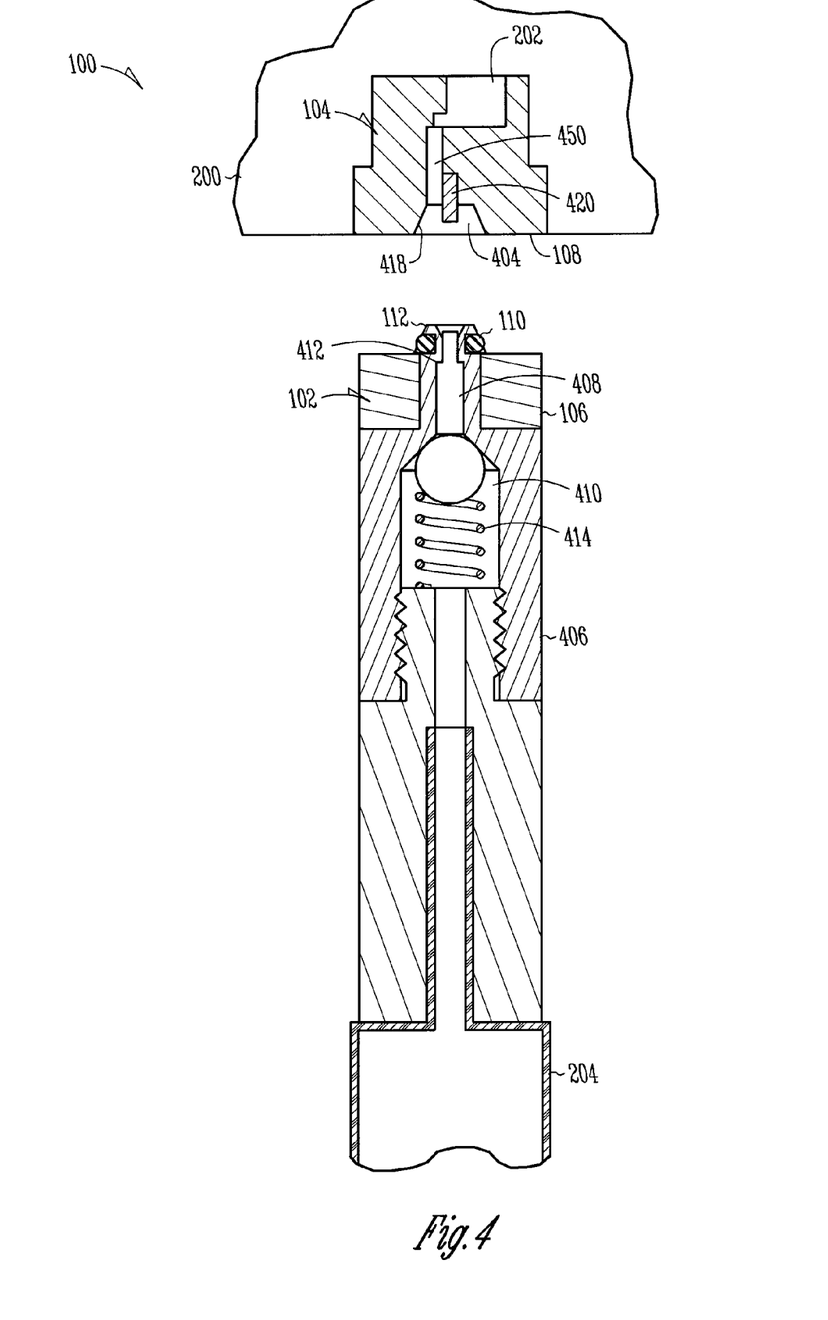
FIG. 4 illustrates, among other things, a sectional view of a disengaged fluid coupling assembly in which the cross sec

In various examples, an engagement portion 112 of the first coupling member 102 includes a size and shape that is complementary with a size and shape of a second coupling member 104 portion, thereby facilitating engagement and alignment of the members. As shown and described in FIG. 3, the magnetic engagement of the first coupling member 102 and the second coupling member 104 unseals a fluid flow path 302 (FIG. 3) between the members, such as by way of concentrating a mechanical force. The first and second magnetic members 106, 108, respectively, can be chosen such that the magnetic force therebetween is sufficient to cause the seal member 110 to fluidly seal the fluid flow path 302 (FIG. 3). Additionally, the magnetic members 106, 108 can be chosen such that the first coupling member 102 and the second coupling member 104 disengage when a predetermined fluid flow path 302 (FIG. 3) pressure is reached. As shown in FIG. 4, the first 102 and second 104 coupling members can be designed such that when this disengagement occurs, the fluid flow path 302 (FIG. 3) is simultaneously sealed or sealed at substantially the same time.

Among other fluid transfer applications, the present fluid coupling assembly 100 can find utility in connecting a fluid supply source, such as a fuel supply source, and a fluid receiving reservoir, such as a fuel receiving reservoir in a fuel cell powered device. Fuel cells are electrochemical devices that can efficiently convert energy stored in convenient fuels into electricity without combustion of the fuel. Among other fluids, the present fluid coupling assembly 100 can be used to transfer one or more of methanol, ethanol, butane, formic acid, one or more borohydride compounds, carbazole, one or more hydrocarbons, one or more alcohols, methane, hydrazine hydrate, propane, ammonia, hydrogen or any other suitable hydrogen-carrying fluids, such as liquid hydrogen carrier described in commonly-owned McLean et al., U.S. patent application Ser. No. 11/538,027 entitled "HYDROGEN SUPPLIES AND RELATED METHODS." Each fuel cell generally comprises a negative electrode, a positive electrode, and a separator within an appropriate container. The fuel cell operates by utilizing chemical reactions that occur at each electrode. Fuel cells are similar to batteries in that both generally have a positive electrode, a negative electrode and electrolytes. However, fuel cells differ from batteries in that the fuel in fuel cells can be quickly refilled without disassembling the cell to keep the cell operable.

It is convenient for fuel cells to be compatible with portable or stationary fuel supply sources, which permit empty or partially empty fuel receiving reservoirs of fuel cell powered devices to be refilled in order to keep the fuel cells, and ultimately the associated fuel cell powered devices, operable. Generally, fuel supply sources suitable for use with portable and other fuel cell powered devices comprise a storage structure having a suitable fuel stored therein. Additionally, these fuel supply sources are typically connectable to the fuel receiving reservoir via a coupling mechanism which provides an actuatable fluid path from the fuel supply to the fuel receiving reservoir. Thus, once the fuel supply and fuel receiving reservoir are fluidly connected and the appropriate valves are open, fuel can transfer from the fuel supply storage structure to the fuel receiving reservoir in the fuel cell powered device.

Figure 2:
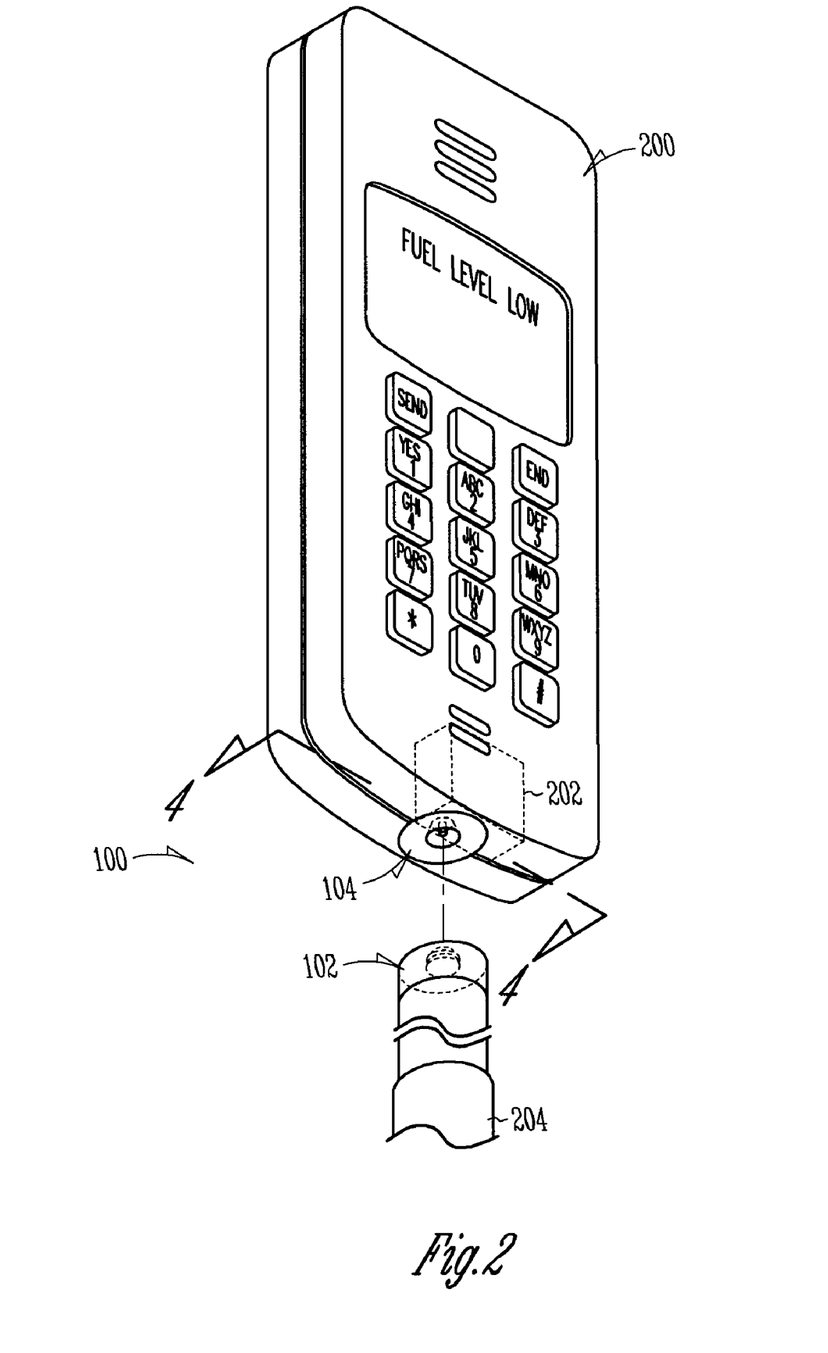
FIG. 2 illustrates a schematic view of a system including a fuel cell powered device having a fuel receiving reservoir, a fuel supply source, a first coupling member and a second coupling member, as constructed in accordance with at least one embodiment.

FIG. 2 illustrates one example of fuel cell powered device, and more specifically, a cellular phone 200 including a fuel cell. When the fuel supply within the cellular phone's fuel receiving reservoir 202 is exhausted, it needs to be either refilled or replaced. To refill the fuel supply, a fluid connection can be made between the fuel receiving reservoir 202 and an external fuel supply source 204 using the present fluid coupling assembly 100, including a first coupling member 102 and a second coupling member 104.

In the example of FIG. 2, the first coupling member 102 is in fluid communication with the external fuel supply source 204, such as a hydrogen supply source described in commonly-owned McLean et al., U.S. patent application Ser. No. 11/538,027 entitled "HYDROGEN SUPPLIES AND RELATED METHODS", a refueling apparatus described in commonly-owned Zimmermann, U.S. patent application Ser. No. 11/535,050 entitled "METHOD AND APPARATUS FOR REFUELING REVERSIBLE HYDROGEN-STORAGE SYSTEMS", or a refueling station described in commonly-owned Iaconis et al., U.S. patent application Ser. No. 11/535,052 entitled "REFUELING STATION", and the second coupling member 104 is in fluid communication with the fuel receiving reservoir 202, such as a fuel enclosure described in commonly-owned Zimmermann, U.S. patent application Ser. No. 11/473,591 entitled, "FLUID ENCLOSURE AND METHODS RELATED THERETO." A fuel storage material, such as a composite hydrogen storage material described in commonly-owned Zimmermann, U.S. patent application Ser. No. 11/379,970 entitled, "COMPOSITE HYDROGEN STORAGE MATERIAL AND METHODS RELATED THERETO," can be disposed within the fuel receiving reservoir 202 for occluding and desorbing the supplied fuel.

While a cellular phone 200 powered by one or more fuel cells is illustrated in FIG. 2, the present fluid coupling assembly 100 can also be used with other fuel cell powered devices in addition to other fluid transfer applications. For instance, the present fluid coupling assembly 100 can be used with satellite phones, laptop computers, computer accessories, ultra mobile computing devices, displays, personal audio or video players, medical devices, televisions, transmitters, receivers, lighting devices (including outdoor lighting or flashlights), electronic toys, power tools, or any other electronic device conventionally used with batteries or fuel combustion.

FIG. 3 illustrates, in cross-section, portions of an engaged fluid coupling assembly 100, in which a first coupling member 102 is releasably and magnetically engaged with a second coupling member 104. As shown, the first coupling member 102 is fluidly connected to an external fuel supply source 204 and the second coupling member 104 is fluidly connected with a fuel receiving reservoir 202 of a fuel cell powered device 200. In certain examples, engagement of the first coupling member 102 and the second coupling member 104 simultaneously or at substantially the same time opens a fluid flow path 302 extending between the external fuel supply source 204 and the fuel receiving reservoir 202. Similarly, as shown in FIG. 4, disengagement of the first and second coupling members 102, 104, respectively, can simultaneously or substantially at the same time seal the fluid flow path 302.

In this example, the magnetic engagement between the first coupling member 102 and the second coupling member 104 is established using one or more first magnetic members 106, such as one or more magnets, and one or more second magnetic members 108, such as one or more magnetic surfaces. The attractive magnetic force between the one or more first magnetic members 106 and the one or more second magnetic members 108 can be designed such that the fluid coupling assembly 100 is strong enough to compress any seal member(s) 110 disposed between the coupling members 102, 104, yet disengages when a predetermined device fuel receiving reservoir 202 internal pressure or fluid flow path 302 pressure is reached. For instance, the attractive magnetic force can be designed such that the first and second coupling members 102, 104, respectively, disengage when the fuel receiving reservoir 202 pressure reaches between about 300 psig (2.07 MPa) and 725 psig (5 MPa) at 55° C., for example. Additionally, the attractive magnetic force between the one or more first magnetic members 106 and the one or more second magnetic members 108 can be designed to disengage due to the occurrence of an accidental event that takes place, for example, during refueling operations. For instance, the attractive magnetic force can be designed such that if someone trips or falls over a refueling hose associated with the fuel supply source 204, the magnetic coupling 100 disengages before the fuel cell powered device 200 is pulled off its supporting surface.

FIG. 4 illustrates, in cross-section, portions of a disengaged fluid coupling assembly 100, in which a first coupling member 102 is spaced from, but magnetically engageable with, a second coupling member 104. In this example, the first coupling member 102 includes a housing 406, a valve member 408, a seal member 110, and one or more first magnetic members 106. The housing 406 has a bore 410 therethrough such that a fluid flow path 302 (FIG. 3) extends from a fuel supply source 204 on a first housing portion to an engagement portion 112, such as an engagement nozzle, on a second housing portion when the fluid coupling assembly 100 is engaged (see FIG. 3). The size or shape of the bore 410 can be guided by desired flow rate requirements and intended applications of the particular coupling assembly. For instance, the bore 410 can have a circular cross-section, an oval cross-section, a rectangular cross-section or the like of various sizes.

An o-ring or other seal member 110 can be disposed on or near the second portion of the housing 406 to seal between the engagement portion 112 of the first coupling member 102 and a recess portion 404 of the second coupling member 104 when the fluid coupling assembly 100 is engaged. Alternatively or additionally, the seal member 110 can be disposed on a portion of the second coupling member 104, such as on a wall of the recess portion 404 or on a portion of a hollow or otherwise configured activation member 420, projecting from a surface of the recess portion 404. By sealing the engagement, the seal member 110 prevents leakage of the fuel being transferred from the fuel supply source 204 to the fuel receiving reservoir 202. Prevention of fuel leakage is important to avoid potential safety hazards, such as exposure to toxic materials, creation of a flammable mixture in ambient air, or causation of environmental pollution. The one or more first magnetic members 106 can also be disposed near the engagement portion 112 of the housing 406 to engage with the second coupling member 104, and in some examples, includes a magnet having a toroidal shape. FIG. 6 illustrates a magnet having a toroidal shape.

The valve member 408 and a resilient member 414 (e.g., a coiled spring) are disposed within the bore 410 and generally function to regulate fluid flow through the first coupling member 102. In certain examples, the valve member 408 moves substantially along an axis of the bore 410 between a sealed position (shown) and an open or unsealed position (see FIG. 3). In the sealed position, a portion of the valve member 408 rests against a valve stop 412 of the housing 406 and a valve lumen near an inner end can be surrounded by the housing. The resilient member 414 is biased to keep the valve member 408 abutted against the valve stop 412. In this way, fluid flow through the first coupling member 102 is prohibited unless another force is applied to counteract the force of the resilient member 414. In the unsealed position, the valve lumen extending from a circumference of the valve member can be exposed allowing fluid to enter into and through valve to the second coupling member 104. Other fluid by-passing arrangements could alternatively be used to allow fluid to flow through the first coupling member 102 to the second coupling member 104 when the valve member 408 is in the unsealed position.

In this example, the second coupling member 104 includes one or more second magnetic members 108, a sealing surface 418 designed to abut against the seal member 110, the hollow activation member 420, a fuel connection 450 to the device's fuel receiving reservoir 202, and the recess portion 404. Additionally, a pressure activated one-way valve can be included in the second coupling member 104 to ensure that the pressurized fuel can flow to the internal fuel receiving reservoir 202, but not leak from the fuel receiving reservoir 202 via the fuel connection 450. In certain examples, but as may vary, the recess portion 404 includes a depth of about 1 mm or less, thereby providing a coupling scheme that does not require much space within the fuel cell powered device 200.

As shown, the activation member 420 projects outwardly from a surface of the recess portion 404 allowing a portion thereof to contact a portion of the valve member 408 when the first coupling member 102 is engaged with the second coupling member 104. In certain examples, the activation member 420 includes a size and a shape configured to closely contact the valve member 408 without any gap allowing such components to align with one another when the first coupling member 102 is magnetically engaged with the second coupling member 104. As shown, the activation member 420 and the valve member 408 can include flat mating faces. In other examples, the activation member 420 can include a spherical, convex surface while the valve member 408 includes a concave surface complementary to the convex surface.

As discussed above in association with FIG. 3, the first and second coupling members 102, 104, respectively, can be engaged with one another using the attracted polarities of the one or more first magnetic members 106 and the one or more second magnetic members 108. As a result, when the first coupling member 102 is placed near the second coupling member 104, the first magnetic member(s) 106 is attracted to the second magnetic member(s) 108, thereby bringing the engagement portion 112 of the first coupling member 102 within the recess portion 404 of the second coupling member 104. This, in turn, compresses the o-ring or other seal member 110 on the first coupling member 102 against the sealing surface 418 on the second coupling member 104 and causes the activation member 420 to actuate the valve member 408 to a position away from the valve seat 412. With the valve member 408 in the open position, fuel from the fuel supply source 204 is allowed to flow to the internal fuel receiving reservoir 202 of the fuel cell powered device 200.

In general, the housing 406, the valve member 408, the activation member 420, and other components of the first coupling member 102 and the second coupling member 104 can include any material suitable for use in fluid transfer applications, such as metals, polymers or combinations thereof. The seal member 110 can include materials such as natural or synthetic rubber or elastomeric polymer. The resilient member 414 can include an elastic spring of any appropriate design, an elastic material or the like.

Figure 5:
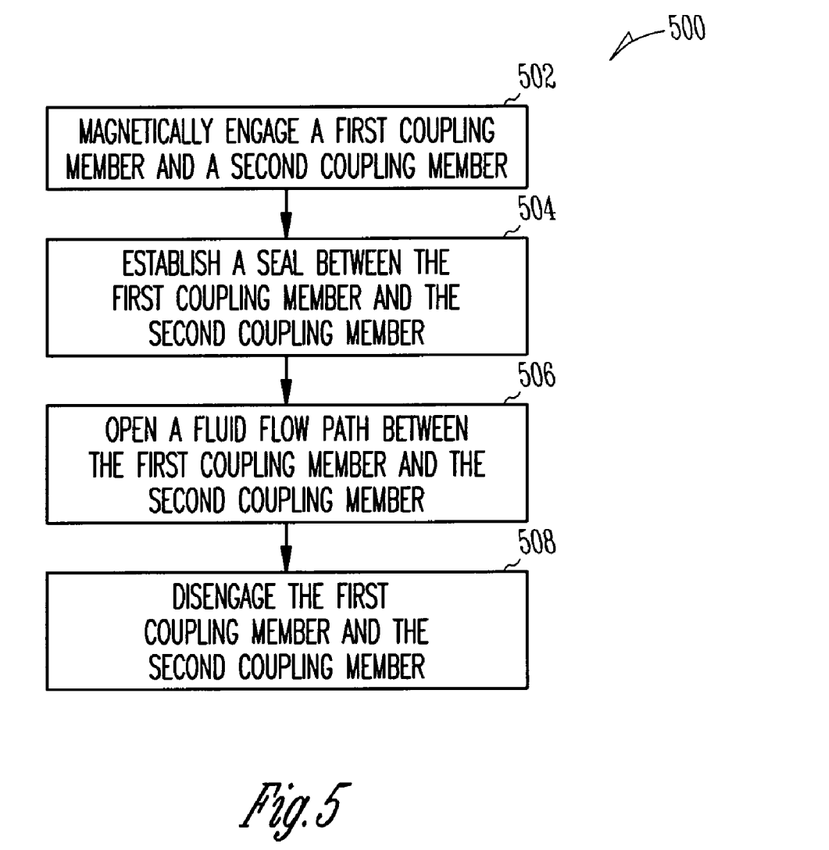
- FIG. 5 illustrates a method of using a fluid coupling assembly, as constructed in accordance with at least one embodiment.

FIG. 5 illustrates a method 500 of using a fluid coupling assembly. At 502, a first coupling member and a second coupling member are magnetically engaged. This engagement can include, for example, a magnetic coupling between a magnet disposed on the first coupling member and a magnetic surface of the second coupling member. In certain examples, this engagement includes inserting an engagement portion of the first coupling member within a recess portion of the second coupling member, such as inserting about 1 mm or less.

At 504, a seal between the first coupling member and the second coupling member is established. In certain examples, this sealing includes the compression of a seal member between the engagement portion of the first coupling member and a sealing surface of the second coupling member. In other examples, this sealing includes the compression of a seal member between the engagement portion of the first coupling member and an activation member of the second coupling member. At 506, a fluid flow path between the first coupling member and the second coupling member is opened by moving a valve member from a resiliently biased sealed position to an unsealed position. In varying examples, the valve member is moved due to contact with the activation member projecting from a surface of the recess portion. At 508, the first coupling member and the second coupling member are disengaged and the fluid flow path is sealed.

Fluid coupling assemblies and methods employing a first coupling member magnetically engaged with a second coupling member have been discussed. Using magnetic forces to engage the first and second coupling members makes refilling a fluid receiving reservoir, for example, very easy and allows for disengagement when the fluid receiving reservoir is filled or when an inadvertent force is placed on a portion of the refilling system (e.g., a refueling hose). As illustrated, the present fluid coupling assemblies may, in certain examples, permit simultaneous unsealing of a fluid flow path when the first and second coupling members are engaged and simultaneous sealing of the fluid flow path when the coupling member are disengaged.

Closing Notes:

The above Detailed Description includes references to the accompanying drawings, which form a part of the Detailed Description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

As used or incorporated herein, the terms "a" or "an" are used, as is common in patent documents, to include one or more than one, independent of any other instances or usages of "at least one" or "one or more." As used to incorporated herein, the term "or" is used to refer to a nonexclusive or, such that "A or B" includes "A but not B," "B but not A," and "A and B," unless otherwise indicated. As used or incorporated herein, the term "fluid" refers to a gas, liquefied gas, liquid, liquid under pressure or any combination thereof having the ability to flow through a first and a second coupling member. Examples of fluid include one or more alcohols, butane, formic acid, one or more borohydride compounds, one or more mixtures of alcohols and borohydrides, one or more ammonia borane solutions, one or more carbazole compounds, one or more hydocarbons, one or more alcohols, methane, hydrazine hydrate, propane, ammonia, hydrogen or any other suitable hydrogen-carrying fluids. As used or incorporated herein, the term "engage," "engaging," or "engagement" refers to physically touching or being within sufficiently close proximity. A first and a second coupling member can engage with one another, thereby allowing a fluid to flow therethrough without leakage. As used herein, the term "stream" refers to a movement or proceeding in a continuously or semi-continuous manner for a period of time. A stream of fluid can move continuously from a fuel supply source to a fuel reservoir, for example, when a first and second coupling member are magnetically engaged.

In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the coupling engagement nozzle and the coupling recess can be reversed with respect to their connections to the fuel cell device and fuel supply source. In addition, the present fluid coupling assemblies and methods can find use with other fluid transfer application, such as non-fuel based fluid applications, where rapid coupling and uncoupling in conjunction with unsealing and sealing, respectively, can be desirable. Further, the fluid receiving reservoir could be removable from the associated device in addition to being non-removably integrated into the device. Other embodiments can be used, such as by one of ordinary skill in the art upon reviewing the above description. Also, in the above Detailed Description, various features can be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

The Abstract is provided to comply with 37 C.F.R. §1.72 (b), to allow the reader to quickly ascertain the nature of the technical disclosure. It is submitted with the understanding that it will not be used to interpret or limit the scope or meaning of the claims.

What is claimed is:

1. A fluid coupling assembly comprising:
   a first coupling member;
   a second coupling member magnetically engageable with the first coupling member;
   a valve member disposed within the first coupling member, wherein the valve member is movable between a sealed position in contact with a valve seat and an unsealed position spaced from the valve seat; and
   a stationary activation member disposed within the second coupling member and configured to move the valve member when the first and second coupling members are magnetically engaged;
   wherein magnetic engagement of the first coupling member and the second coupling member provides and maintains a mechanical force sufficient to unseal a fluid flow path traversing a portion of each coupling member.

2. The fluid coupling assembly of claim 1, further including a seal member disposed between a portion of the first coupling member and a portion of the second coupling member and the mechanical force is sufficient to cause the seal member to prevent or reduce fluid leakage when the first and second coupling members are magnetically engaged.

3. The fluid coupling assembly of claim 1, wherein the second coupling member is integrated into a housing of a cellular phone, a satellite phone, a laptop computer, a computer accessory, a display, an audio or video player, a medical device, a television, a transmitter, a receiver, a lighting device, a power tool, or an electronic toy.

4. The fluid coupling assembly of claim 1, wherein the valve member is the only valve member of the fluid coupling assembly.

5. The fluid coupling assembly of claim 1, wherein the fluid coupling is disposed between a fuel supply source and a fuel reservoir in a fuel cell powered device.

6. The fluid coupling assembly of claim 1, wherein the stationary activation member is the only stationary activation member of the fluid coupling assembly.

7. The fluid coupling assembly of claim 1, wherein the stationary activation member is hollow and the fluid flow path is configured to extend therethrough.

8. The fluid coupling assembly of claim 1, wherein the stationary activation member includes a mating face having a convex surface.

9. The fluid coupling assembly of claim 1, wherein the first and second coupling members disengage when the mechanical force is overcome and disengagement of the first and second coupling members seals the fluid flow path.

10. A fluid coupling assembly comprising:
    a first coupling member;
    a second coupling member magnetically engageable with the first coupling member;
    a single valve member disposed within the first coupling member, wherein the single valve member is the only valve member of the fluid coupling assembly and is movable between a sealed position in contact with a valve seat and an unsealed position spaced from the valve seat; and
    an activation member disposed within the second coupling member and configured to move the single valve member when the first and second coupling members are magnetically engaged;
    wherein magnetic engagement of the first coupling member and the second coupling member provides and maintains a mechanical force sufficient to unseal a fluid flow path traversing a portion of each coupling member.

11. The fluid coupling assembly of claim 10, further including a seal member disposed between a portion of the first coupling member and a portion of the second coupling member and the mechanical force is sufficient to cause the seal member to prevent or reduce fluid leakage when the first and second coupling members are magnetically engaged.

12. The fluid coupling assembly of claim 10, wherein the second coupling member is integrated into a housing of a cellular phone, a satellite phone, a laptop computer, a computer accessory, a display, an audio or video player, a medical device, a television, a transmitter, a receiver, a lighting device, a power tool, or an electronic toy.

13. The fluid coupling assembly of claim 10, wherein the activation member is stationary and is the only activation member of the fluid coupling assembly.

14. The fluid coupling assembly of claim 10, wherein the fluid coupling is disposed between a fuel supply source and a fuel reservoir in a fuel cell powered device.

15. The fluid coupling assembly of claim 10, wherein the activation member is hollow and the fluid flow path is configured to extend therethrough.

16. The fluid coupling assembly of claim 10, wherein the activation member includes a mating face having a convex surface.

17. The fluid coupling assembly of claim 16, wherein the single valve member includes a mating face having a concave surface complementary to the convex surface of the activation member.

18. A method of coupling a fuel supply source and a fuel reservoir in a fuel cell powered device, the method comprising:
    magnetically engaging a first coupling member with a complimentary portion of a second coupling member of a fluid coupling assembly, wherein the fluid coupling assembly includes
    the first coupling member;
    the second coupling member magnetically engageable with the first coupling member;
    a valve member disposed within the first coupling member, wherein the valve member is movable between a sealed position in contact with a valve seat and an unsealed position spaced from the valve seat; and
    a stationary activation member disposed within the second coupling member and configured to move the valve member when the first and second coupling members are magnetically engaged;
    establishing a seal between the first coupling member and the second coupling member, including preventing fluid leakage between the fuel supply source and the fuel reservoir; and
    opening a fluid flow path between the first coupling member and the second coupling member by bringing a portion of the stationary activation member in contact with a portion of the valve member.

19. The method of claim 18, wherein opening the fluid flow path includes allowing a stream of at least one of hydrogen, one or more alcohols, butane, formic acid, one or more borohydride compounds, one or more mixtures of alcohols and borohydrides, one or more ammonia borane solutions, one or more carbazole compounds, one or more hydrocarbons, one or more alcohols, methane, hydrazine hydrate, propane, or ammonia to flow from the fluid supply source to the fluid receiving reservoir.

20. The method of claim 18, wherein magnetically engaging the first coupling member and the second coupling member includes coupling a magnet disposed on the first coupling member and a magnetic surface disposed on the second coupling member.

21. The method of claim 18, wherein magnetically engaging the first coupling member and the second coupling member includes overlapping the first and second engagement portions less than about 1 mm.

22. The method of claim 18, wherein establishing a seal between the first coupling member and the second coupling member includes compressing a seal member disposed between a portion of the first coupling member and a portion of the second coupling member.

23. The method of claim 18, further comprising disengaging the first coupling member and the second coupling member, including moving the valve member to the sealed position, the sealed position being resiliently biased, thereby sealing the fluid flow path.

24. The method of claim 23, wherein disengaging the first coupling member and the second coupling member includes attaining a predetermined internal pressure of the fuel reservoir.

25. The method of claim 23, wherein disengaging the first coupling member and the second coupling member is directionally independent.

26. The method of claim 18, wherein the valve member is the only valve member of the fluid coupling assembly.

27. The method of claim 18, wherein the stationary activation member is the only stationary activation member of the fluid coupling assembly.

28. The method of claim 18, wherein the stationary activation member is hollow and the fluid flow path is configured to extend therethrough.

29. The method of claim 18, wherein the stationary activation member includes a mating face having a convex surface.

30. A method of coupling a fuel supply source and a fuel reservoir in a fuel cell powered device, the method comprising:
    magnetically engaging a first coupling member with a complimentary portion of a second coupling member of a fluid coupling assembly, wherein the fluid coupling assembly includes
        the first coupling member;
        the second coupling member magnetically engageable with the first coupling member;
        a single valve member disposed within the first coupling member, wherein the single valve member is the only valve member of the fluid coupling assembly and is movable between a sealed position in contact with a valve seat and an unsealed position spaced from the valve seat; and
        an activation member disposed within the second coupling member and configured to move the single valve member when the first and second coupling members are magnetically engaged;
    establishing a seal between the first coupling member and the second coupling member, including preventing fluid leakage between the fuel supply source and the fuel reservoir; and
    opening a fluid flow path between the first coupling member and the second coupling member by bringing a portion of the activation member in contact with a portion of the single valve member.

31. The method of claim 30, wherein opening the fluid flow path includes allowing a stream of hydrogen to flow from the fluid supply source to the fluid receiving reservoir.

32. The method of claim 30, wherein magnetically engaging the first coupling member and the second coupling member includes coupling a magnet disposed on the first coupling member and a magnetic surface disposed on the second coupling member.

33. The method of claim 30, wherein magnetically engaging the first coupling member and the second coupling member includes overlapping the first and second engagement portions less than about 1 mm.

34. The method of claim 30, wherein establishing a seal between the first coupling member and the second coupling member includes compressing a seal member disposed between a portion of the first coupling member and a portion of the second coupling member.

35. The method of claim 30, further comprising disengaging the first coupling member and the second coupling member, including moving the single valve member to the sealed position, the sealed position being resiliently biased, thereby sealing the fluid flow path.

36. The method of claim 35, wherein disengaging the first coupling member and the second coupling member includes attaining a predetermined internal pressure of the fuel reservoir.

37. The method of claim 35, wherein disengaging the first coupling member and the second coupling member is directionally independent.

38. The method of claim 30, wherein the activation member is the only activation member of the fluid coupling assembly and is stationary.

39. The method of claim 30, wherein the activation member is hollow and the fluid flow path is configured to extend therethrough.

40. The method of claim 30, wherein the activation member includes a mating face having a convex surface.

* * * * *

UNITED STATES PATENT AND TRADEMARK OFFICE
CERTIFICATE OF CORRECTION

PATENT NO.         : 7,891,637 B2
APPLICATION NO.    : 11/936662
DATED              : February 22, 2011
INVENTOR(S)        : Joerg Zimmermann et al.

It is certified that error appears in the above-identified patent and that said Letters Patent is hereby corrected as shown below:

In column 1, line 61, delete "engagable," and insert -- engageable, --, therefor.

In column 3, line 4, delete "member," and insert -- member; --, therefor.

In column 3, line 58, delete "hydocarbons," and insert -- hydrocarbons, --, therefor.

In column 5, line 6, delete "torroidal" and insert -- toroidal --, therefor.

In column 10, line 17, delete "hydocarbons," and insert -- hydrocarbons, --, therefor.

Signed and Sealed this
Tenth Day of May, 2011

David J. Kappos
*Director of the United States Patent and Trademark Office*